WILLIAM BAILY COATE'S
IMPROVED SAD IRON HOLDER

117515        PATENTED AUG 1 1871

WITNESSES
Samuel Johnson
John. J. Houghton.

William Baily Coates.
Inventor.
Phila. Pa.

117,515

UNITED STATES PATENT OFFICE.

WILLIAM BAILY COATES, OF PHILADELPHIA, PENNSYLVANIA.

IMPROVEMENT IN COMPOSITION SAD-IRON HOLDERS.

Specification forming part of Letters Patent No. 117,515, dated August 1, 1871; antedated July 20, 1871.

*To all whom it may concern:*

Be it known that I, WILLIAM BAILY COATES, of Philadelphia, in the State of Pennsylvania, have invented a new and useful Sad-Iron Holder, of which the following is a specification:

The object of my invention is to construct an iron-holder in a simple and durable manner, so as not to easily slip from the handle when in use, and not easily burned. The nature of my invention consists in the construction of an iron-holder of materials that are in themselves non-conductors of heat, and putting them through a fire-proofing preparation that will tend to render them still better able to resist the action of heated surfaces; and in the introduction of two materials—Manila paper, on account of its strength, or its equivalent, in the body of the holder, and hickory-strips, on account of elasticity and toughness, or their equivalent—on the under side of the holder.

To enable others skilled in the art to make and use my invention, I will proceed to describe its construction and operation.

Figure 1:
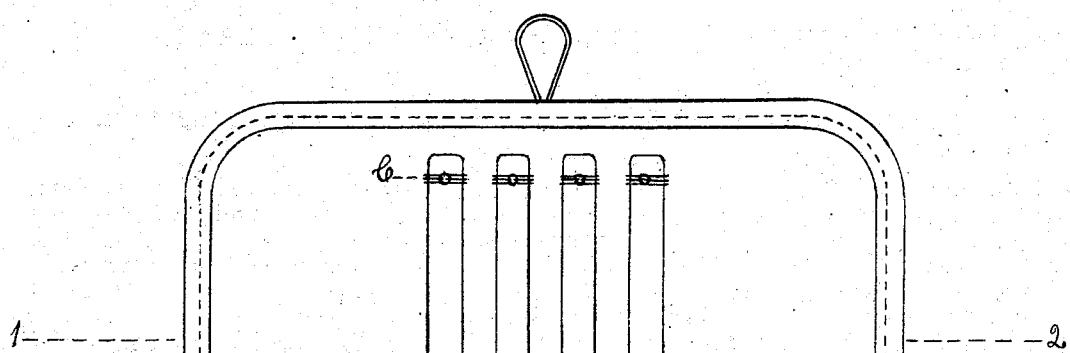
Figure 2:
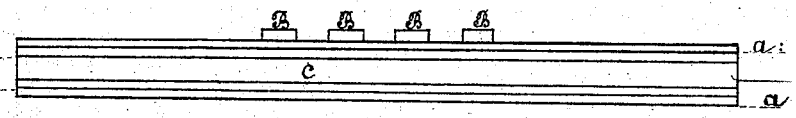
Figure 3:
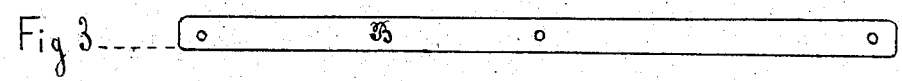

In reference to the drawing and letters of reference marked thereon forming part of this specification, Figure 1 is a plan of the under part of my new iron-holder. Fig. 2 is a transverse section through the line 1 2. Fig. 3 is a plan of the hickory-strips.

The iron-holder body A can be of any required size and shape. The ticking-cloth *a*, woolen cloth *b*, and Manila paper *c* can each be cut out in large numbers quickly with knives and hand-screw presses. The hickory-strips B can be three inches long and one-quarter of an inch wide, more or less, and an eighth of an inch thick, more or less, with holes in each end and the middle. The sad-iron holder can be made by first securing the strips B at the top, middle, and lower holes onto the ticking *a* by sewing with a long thin needle and fine copper wire C or its equivalent, through the holes and over right and left side of each strip. The second strip can be first put on, then the others, and can be about one-fourth of an inch, more or less, apart. Then put on one thickness of woolen cloth, *b*, more or less; then eight thicknesses of Manila paper, *c*, more or less; then one thickness of woolen cloth, *b*, more or less; then ticking-cloth *a*, or fancy top of woolen or cotton cloth. Whip the edges of all the thicknesses together, and finely bind with woolen or cotton, leaving a loop at top. The various materials, when cut out for use, can all be saturated with the preparation mentioned below and then dried. The hickory-strips can be soaked six hours. The ticking-cloth can be soaked one hour and dried. The Manila paper should be only saturated and dried as soon as possible.

The preparation is, to wit: In one gallon of hot water slake one ounce of good lime, and strain. Into this lime-water put eight ounces of alum dissolved in one pint of hot water, and strain; and one quart of fine rock-salt dissolved in one quart of hot water, and strain. Mix all well together, and use cold.

This holder will be very difficult to blaze or scorch, and can be made entirely by girls and sold cheaply, enabling every family to purchase so useful, cheap, and necessary a household article.

What I claim as my invention, and desire to secure by Letters Patent, is—

1. The Manila paper *c* or its equivalent, put through the fire-proofing preparation, as described, for the construction of an iron-holder.

2. The hickory-strips B or their equivalent, with holes near the ends and one in the middle, as described, put through the fire-proofing preparation, as described, for the purpose of covering, in whole or part, the under side of an iron-holder.

3. The sad-iron-holder body A, as described, the hickory-strips B, as described, or their equivalent, put through the fire-proofing preparation, as described, in combination.

WILLIAM BAILY COATES.

Witnesses:
   JOHN T. HOUGHTON,
   JOSEPH LEEDS.